UNITED STATES PATENT OFFICE.

MARTIN L. MALONEY, OF WASHINGTON, DISTRICT OF COLUMBIA, ASSIGNOR OF ONE-HALF HIS RIGHT TO JACKSON PROUTY, OF SAME PLACE.

IMPROVEMENT IN PAINTS.

Specification forming part of Letters Patent No. 206,118, dated July 16, 1878; application filed June 26, 1878.

*To all whom it may concern:*

Be it known that I, MARTIN L. MALONEY, of Washington, in the District of Columbia, have invented a new and valuable Improvement in Paints; and I do hereby declare that the following is a full, clear, and exact description of the same.

In the manufacture of my paint the first step is to prepare the varnish, which is the base of the paint. It is prepared from the following materials and in the following proportions, viz: One gallon of linseed-oil, one-half pound of litharge, one-half pound of red lead, one-half pound of raw umber, one ounce of sugar of lead, and one-quarter pound of shellac.

All these ingredients, except the shellac, are mixed and boiled in a suitable vessel for from one and a half to two hours, or until by rubbing a portion of it on the palm of the hand with the finger a white foam is made. Then the mixture is cooled for a few minutes, and the shellac is stirred in until dissolved. When nearly cool it is strained through a hair-sieve.

The next step is to take the following materials, viz: Two and a half pounds of asphaltum, one-half pound of shellac, one-eighth of a pound of gum-copal, one-eighth of a pound of gum-dammar, one quart of the above-described varnish, two pounds of Venetian red, one-half pint of crude turpentine, and one quart of spirits of turpentine.

To the asphalt, when well dissolved by heat, add the shellac, copal, and dammar, and stir in until well mixed; then add the varnish, Venetian red, and crude turpentine. When well mixed allow to cool and add the spirits of turpentine, after which the mixture is ground in the mill and run into barrels for sale or use.

What I claim as new and of my own invention, and for which I desire to secure Letters Patent, is—

A paint composed of a varnish of linseed-oil, shellac, and driers, to which is subsequently added asphalt, shellac, copal, dammar, sugar of lead, red lead, crude turpentine, Venetian red, and spirits of turpentine, the whole being well dissolved and combined by heat, in about the proportions stated, to form my improved paint.

In testimony that I claim the above I have hereunto subscribed my name in the presence of two witnesses.

MARTIN L. MALONEY.

Witnesses:
   E. N. HILL,
   WILLIAM J. PATTON.